US005728455A

United States Patent [19]

Batzar

[11] Patent Number: 5,728,455

[45] Date of Patent: Mar. 17, 1998

[54] RANDOMLY PATTERNED COOKWARE

[75] Inventor: Kenneth Batzar, Cherry Hill, N.J.

[73] Assignee: E. I. du Pont de Nemours and Company, Wilmington, Del.

[21] Appl. No.: 476,929

[22] Filed: Jun. 7, 1995

Related U.S. Application Data

[63] Continuation-in-part of Ser. No. 362,078, Dec. 22, 1994, abandoned.

[51] Int. Cl.$^6$ .............................. B32B 27/30; B32B 7/02

[52] U.S. Cl. ......................... 428/216; 428/215; 428/201; 428/203; 428/204

[58] Field of Search .................................... 427/258, 265, 427/267, 287, 385.5; 428/420, 422, 421, 425.8, 142, 201, 203, 204, 215, 216

[56] References Cited

U.S. PATENT DOCUMENTS

| | | | |
|---|---|---|---|
| 3,655,421 | 4/1972 | Long | 117/45 |
| 4,169,083 | 9/1979 | Vassiliou | 260/23 |
| 4,259,375 | 3/1981 | Vassilliou | 427/267 |
| 4,311,634 | 1/1982 | Vassiliou | 260/42.27 |
| 4,677,000 | 6/1987 | Gardaz et al. | 427/261 |
| 4,711,802 | 12/1987 | Tannenbaum | 428/207 |
| 5,168,013 | 12/1992 | Tannenbaum | 428/422 |
| 5,233,358 | 8/1993 | Yamada et al. | 430/18 |

FOREIGN PATENT DOCUMENTS

| | | |
|---|---|---|
| 285 161 | 2/1992 | European Pat. Off. . |
| 2 594 673 - A3 | 8/1987 | France . |
| 1 572 842 | 8/1980 | United Kingdom . |
| 2 174 315 | 11/1986 | United Kingdom . |

*Primary Examiner*—Shrive Beck
*Assistant Examiner*—Fred J. Parker

[57] ABSTRACT

Cookware with a multi-layer, non-stick coating on its cooking surface has a random spattered pattern of raised dots or globules in an inner coat, telegraphing roughness through an outer coating to create texture.

11 Claims, No Drawings

RANDOMLY PATTERNED COOKWARE

CROSS REFERENCE TO RELATED APPLICATIONS

This is a continuation-in-part of application Ser. No. 08/362.078 filed Dec. 22, 1994, abandoned.

BACKGROUND OF THE INVENTION

This invention concerns non-stick coated cookware, with a decorative pattern visible through a light transmitting topcoat. More specifically, it concerns such cookware with a textured surface.

U.S. Pat. No. 4,259,375—Vassiliou (1981) discloses an article of cookware with a 3-layer coating having a discontinuous speckled or spattered pattern in a partial layer directly beneath the topcoat. The spattered coating is deliberately sprayed directly on the layer under it while the under layer is still wet and soft so that the spattered layer sinks into the under layer and does not provide roughness that could telegraph through the surface. It was said that roughness would provide a place for a fork or other utensil to catch in the coating and tear the coating. The spattered layer dots were also sprayed on directly, such as at 90 degrees from the substrate, so as to form more or less round dots. This patent is incorporated by reference herein for its disclosure of materials, processes and equivalents suitable for the present invention.

U.S. Pat. No. 3,961,993—Palisin (1976) discloses spraying multilayer polymer coatings on a substrate, one layer being sprayed on top of the layer under it after the under layer has become tacky. A tacky underlayer permits the successive layer to adhere better without completely merging indistinguishably with the underlayer. Still, any roughness in the upper layer would tend to smooth out as the two layers interact.

U.S. Pat. No. 3,655,421—Long (1972) describes means of keeping globules of an intermittent coating from flowing out to make a uniform layer, by controlling surface tension relations.

It is desirable to have a superior non-stick, decorative coating for cookware with a raised or textured surface and with greater flexibility for aesthetic design than just to make smooth round dots.

SUMMARY OF THE INVENTION

The present invention provides an article of cookware having a cooking surface which comprises a multi-layer, non-stick coating which minimizes sticking by food residues and which is heat resisting by being stable at temperatures above 300° C. on a substrate, wherein the coating comprises a primer adhered to the substrate, a non-stick, heat-resisting, light-transmitting topcoat, and optionally one or more intermediate coats, with the topcoat adhered to any such intermediate coats which are adhered to the primer or, in the absence of intermediate coats, the topcoat being adhered directly to the primer, with the coating under the topcoat having a first color or darkness, wherein a discontinuous layer of raised globules is present on and covers no more than 80% of the area of the coating under the topcoat, said globules having at least one color or darkness which is visibly different than said first color or darkness as seen through said topcoat, said discontinuous layer creating a texture or roughness in said topcoat.

Included in the invention are a method of making an article in which the coatings are applied by spraying coating compositions successively on the substrate and ultimately heating the article to cure the coating, wherein the coating under the discontinuous coating is dried enough before applying the discontinuous coating so that substantial portions of the spattered coating remains on top of said under coating to create the roughness telegraphing through the topcoat.

DETAILED DESCRIPTION

An important part of the process for obtaining the present invention is the drying or "flashing" the primer or intermediate coat before applying the discontinuous coat, adequately so the spattered dots do not sink into the primer or the intermediate coat. In normal application, air flow for 30 seconds or longer, or preheating the substrate or the air with a shorter time of air flow, will suffice.

Those skilled in the an know how to select the ingredients of each coating to avoid wetting which might cause the globules to run together. Wetting is generally not a problem with most heat resistant materials useful for cookware coatings, especially perfluoropolymers such as polytetrafluoroethylene and (PTFE) and copolymers of TFE and fluorovinyl ethers (PFA).

Preferably the coatings contain oxide-coated mica, and preferably the oxide in $TiO_2$, as described in U.S. Pat. Nos. 3,087,827—Klenke et al., 3,087,828 and 3,087,829—both to Linton, and granted 1963.

In the examples which follow, parts, percentages and proportions are given by weight except where stated otherwise.

EXAMPLE 1

A primer having the composition of Table 1 is sprayed on a clean, lightly etched aluminum substrate to a dry film thickness (DFT) of 7.5 to 10 microns, the primer is dried at 66° C. for 3 minutes and a black midcoat of Table 2 is applied to a DFT of 17.5 to 20 microns. The midcoat is allowed to dry at ambient temperature for 45 seconds and three separate inks or spatter coatings are applied using a DeVilbiss spatter gun to provide a discontinuous coming. The inks of Table 3 or 4 are colored to be significantly different than the black midcoat background and are sprayed at a 45° angle (or at an angle of from 30° to 75°) to provide irregular shapes on the spinning substrate. The effect is to provide an appearance of natural stone. The inks are not limited to solid color pigments but also include color achieved by reflectance with coated mica. Furthermore, mixtures of solid pigments, different colored coated mica, and all of these can be used for unusual optical effects. A topcoat of Table 5 is then applied wet-on-wet over the spattered particles. The topcoat, in this example, contains mica particles in a 1–15 micron particle size range so as not to interfere with the aesthetics of the spatter coat. The entire system is sintered at 427° to 435° C. for 5 minutes. The temperature being controlled is that of the substrate metal rather than that of the oven, which will vary with the speed of product through the oven and the length of the oven.

TABLE 1

| Primer | Coating Composition (Wt. %) | Solids Content in Finished Article (Wt %) |
|---|---|---|
| Furfuryl Alcohol | 1.82 | — |
| Polyamic acid salt in N-Methyl Pyrrolidone | 18.10 | 24.48 |
| Water | 48.33 | — |
| Mica coated with $TiO_2$ | 0.05 | 0.24 |
| PTFE Dispersion | 7.93 | 22.19 |
| FEP Dispersion | 5.88 | 15.08 |
| Colloidal Silica Dispersion | 3.58 | 5.00 |
| Ultramarine blue dispersion | 13.74 | 32.06 |
| Aluminum silicate dispersion | 0.58 | 0.94 |

TABLE 2

| Intermediate | Coating Composition (Wt. %) | Solids Content in Finished Article (Wt %) |
|---|---|---|
| PTFE Dispersion | 56.34 | 77.43 |
| PFA Dispersion | 10.21 | 14.22 |
| Water | 4.62 | — |
| Carbon black dispersion | 2.71 | 3.79 |
| Ultramarine blue dispersion | 0.49 | 3.22 |
| Mica coated with $TiO_2$ | 0.75 | 1.73 |
| Surfactant catalyst soln. | 12.63 | — |
| Acrylic dispersion | 12.23 | — |

TABLE 3

Typical spatter ink formulation composition (parts by weight)

| | A (white) | B (gray) | C (brown) |
|---|---|---|---|
| PTFE Dispersion | 542.0 | 542.0 | 542.0 |
| PFA Dispersion | 96.0 | 96.0 | 96.0 |
| Ceramic Dispersion | 50.0 | 50.0 | — |
| $TiO_2$ Dispersion | 100.0 | 100.0 | 20.0 |
| Iron Oxide Dispersion | — | — | 80.0 |
| Channel Black Dispersion | — | 8.0 | 2.0 |
| Solvent Surfactant Blend | 110.00 | 110.00 | 110.00 |
| Acrylic Dispersion | 120.00 | 120.00 | 120.00 |
| Solvent-Surfactant Blend | 30.00 | 30.00 | 30.00 |
| Hydroxylpropyl cellulose soln. | 30.00 | 15.00 | 20.00 |
| Viscosity in centipoise as measured by Brookfield #2 spindle, @20 rpm | 682 | 608 | 682 |

TABLE 4

| | White | | Gray | |
|---|---|---|---|---|
| Spatter Coats | Coating Composition (Wt. %) | Solids Content in Finished Article (Wt. %) | Coating Composition (Wt. %) | Solids Content in Finishes Article (Wt. %) |
| PTFB Dispersion | 50.29 | 71.04 | 50.61 | 70.63 |
| PFA Dispersion | 8.91 | 12.58 | 8.96 | 12.52 |
| $Al_2O_3$ Ceramic Dispersion | 4.64 | 5.46 | 4.67 | 5.43 |
| $TiO_2$ Dispersion | 9.28 | 10.92 | 9.34 | 10.86 |
| Carbon black Dispersion | — | — | 0.75 | 0.52 |
| Surfactant-Catalyst Solution | 12.99 | — | 13.07 | — |
| Acrylic Dispersion | 11.13 | — | 11.20 | — |
| Hydroxyl propyl cellulose soln. | 2.78 | — | 1.40 | — |
| Viscosity in centipoise as measured by Brookfield #2 spindle, @20 rpm | 682 | | 608 | |

TABLE 5

| Topcoat | Coating Composition (Wt. %) | Solids Content in Finished Article (Wt %) |
|---|---|---|
| PTFB Dispersion | 66.73 | 94.04 |
| PFA Dispersion | 3.51 | 4.95 |
| Water | 3.77 | — |
| Mica coated with $TiO_2$ | 0.43 | 1.01 |
| Surfactant catalyst soln. | 12.52 | — |
| Acrylic dispersion | 13.04 | — |

COMPARISON 1

The same process is carried out except the discontinuous coat is applied immediately after midcoat application (wet-on-wet) without flash drying.

Accelerated abuse cooking results, using 6 pans of each, gave the results of Table 6. The rating of 5 is a standard judged by an experienced tester, based on damage to the coating from a number of standardized cooking tests, using weighted ball point pens to abuse the coatings. This shows the superior durability of the invention.

TABLE 6

| | # of cooks to 5 rating |
|---|---|
| Ex. 1 | 97 Avg |
| Comparison 1 | 78 Avg |

I claim:

1. An article of cookware having a cooking surface which comprises a substrate and a multi-layer, non-stick fluorapolymer coating thereon which mimimizes sticking by food residues and which is heat resisting by being stable at temperatures above 300° C., wherein the multi-layer fluoropolymer coating comprises (1) a fluoropolymer primer coating adhered to the substrate, (2) a non-stick, heat-resisting, light-transmitting fluoropolymer topcoat coating, (3) at least one optional fluoropolymer intermediate coating, said primer coating or said at least one optional fluoropolymer intermediate coating when it is present, having a first color or darkness, and (4) a fluoropolymer discontinuous layer of raised globules present on and covering no more than 80% of an area of the primer coating or at least one optional fluoropolymer intermediate coating when it is present under said globule-containing discontinuous layer, said globules having at least one color or darkness, which is visibly different than said first color or darkness as seen through said topcoat, said globule-containing discontinuous layer creating a texture or roughness which telegraphs through said topcoat.

2. The article of claim 1 in which the visual difference between the primer coating or at least one optional fluoropolymer intermediate coating when it is present and the globule-containing discontinuous layer is in the color of each.

3. The article of claim 1 in which the visual difference between the primer coating or at least one optional fluoropolymer intermediate coating when it is present and the globule-containing discontinuous layer is in the darkness of each.

4. The article of claim 1 wherein the globules contain $TiO_2$-coated mica.

5. The article of claim 1 in which surfaces of the article other than the cooking surface also have the same multilayer coating.

6. The article of claim 1 in which each coating of the multi-layer coating comprises perfluorinated ethylene polymers or copolymers.

7. The article of claim 1 in which the thickness of the globule-containing discontinuous spattered layer is 10 to 15 microns, and the thickness of the topcoat is 7.5 to 10 microns.

8. The article of claim 1 in which the globule-containing discontinuous layer comprises fluoropolymer and mica, optionally with a coating of $TiO_2$ on the mica.

9. The article of claim 1 in which the globule-containing discontinuous layer comprises fluoropolymer and ceramic particles selected from the group consisting of alumina and alumina-titania combination.

10. The article of claim 1 in which the at least one optional fluoropolymer intermediate layer is absent.

11. The article of claim 1 in which the at least one optional fluoropolymer intermediate coating is present as one layer.

* * * * *